United States Patent [19]

Matthews

[11] 4,142,108
[45] Feb. 27, 1979

[54] GEOTHERMAL ENERGY CONVERSION SYSTEM

[75] Inventor: Hugh B. Matthews, Boylston, Mass.

[73] Assignee: Sperry Rand Corporation, New York, N.Y.

[21] Appl. No.: 860,270

[22] Filed: Dec. 13, 1977

Related U.S. Application Data

[63] Continuation-in-part of Ser. No. 674,243, Apr. 6, 1976, abandoned.

[51] Int. Cl.² ............................................. F03G 7/00
[52] U.S. Cl. ..................................... 290/1 R; 60/641; 290/52; 60/398
[58] Field of Search ...................... 60/641, 398; 290/1, 290/52; 165/53, 405, 379

*Primary Examiner*—Robert K. Schaefer
*Assistant Examiner*—John W. Redman
*Attorney, Agent, or Firm*—Howard P. Terry; Albert P. Cefalo

[57] ABSTRACT

A geothermal energy recovery system of improved efficiency makes use of thermal energy stored in hot, solute-bearing well water as it is pumped upward to the earth's surface through an extended heat exchange element for continuously heating a downward flowing organic fluid to a supercritical state. Some of the energy of the latter fluid is used within the well for operating a turbine-driven pump for pumping the hot, solute-bearing well water at high pressure and always in liquid state to the earth's surface, where it is reinjected into the earth in another well. The temperature difference between the upward flowing brine and the downward flowing organic fluid is maintained finite in a predetermined manner along the subterranean extended heat exchange element. After driving the deep-well turbine-driven pump, the organic fluid arises to the earth's surface in a thermally insulated conduit; at the earth's surface, vapor turbine electrical power generation equipment is driven by the heated organic fluid which is then returned into the well for reheating in the extended heat exchanger.

32 Claims, 21 Drawing Figures

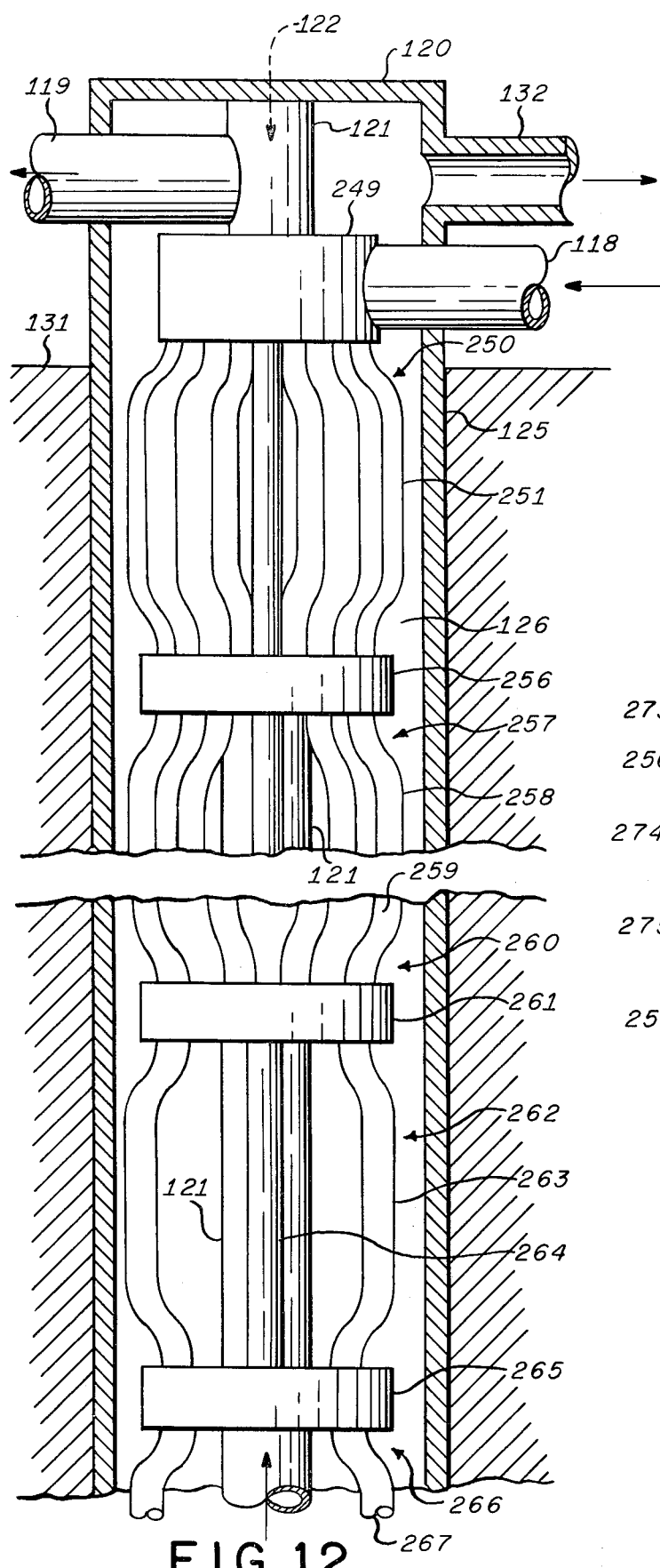
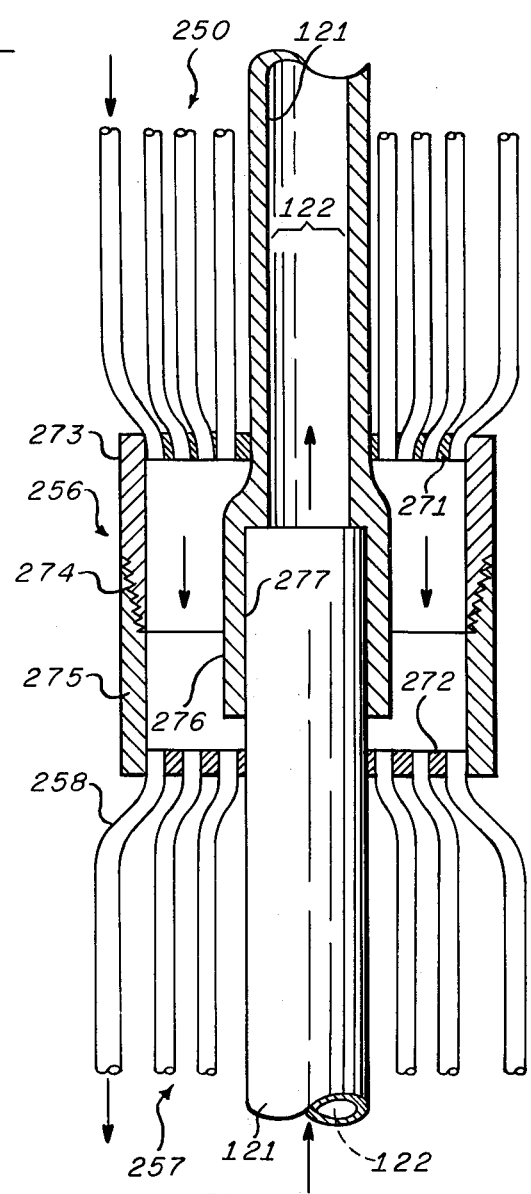
FIG. 12.
FIG. 13.

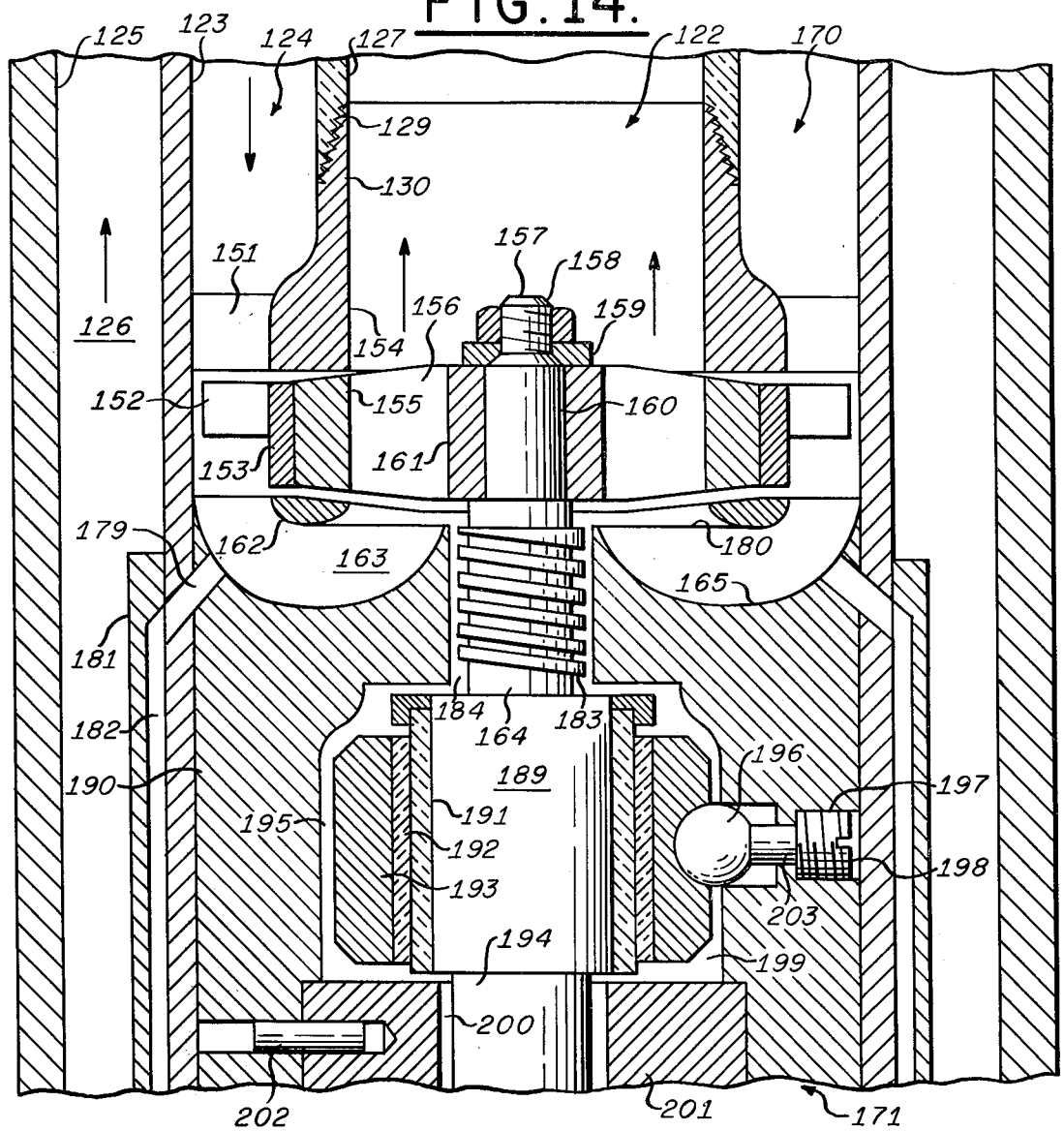
FIG. 14.
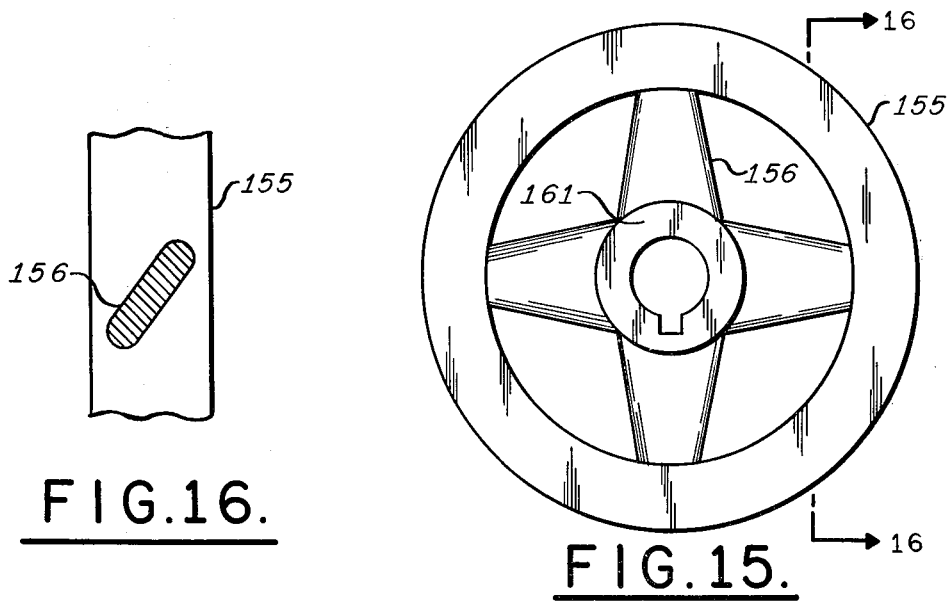
FIG. 16.
FIG. 15.

GEOTHERMAL ENERGY CONVERSION SYSTEM

This is a continuation-in-part of application Ser. No. 674,243, filed Apr. 6, 1976 now abandoned.

BACKGROUND OF THE INVENTION

1. Field of the Invention

The invention relates generally to efficient means for the generation of electrical or other power utilizing energy from subterranean geothermal sources and, more particularly, relates to novel arrangements including efficient deep well heat exchange and pumping equipment for application in deep hot brine wells for the transfer of thermal energy for use at the earth's surface.

2. Description of the Prior Art

A basic advance in the geothermal power extraction art, not limited to use with the rare dry steam geothermal sources and also devoid of the steam and geothermal brine separation problems and the consequent corrosion problems attached to prior art systems using mixed steam and hot water supply wells, was presented in the H. B. Matthews U.S. Pat. No. 3,824,793, issued Oct. 24, 1972 for a "Geothermal System and Method", and in the divisional application which resulted in the U.S. Pat. No. 3,898,020 of the same title, issued May 8, 1974. These Matthews patents provide an arrangement which will be discussed in further detail hereinafter in connection with FIGS. 1, 3a, and 3b.

Improvements in the basic Matthews concept appear in more recently filed U.S. patents also assigned to Sperry Rand Corporation:

K. E. Nichols et al U.S. Pat. No. 3,905,196, issued Sept. 16, 1975 for a "Geothermal Energy Pump Thrust Balance Apparatus", J. L. Lobach U.S. Pat. No. 3,908,380, issued Sept. 30, 1975 for a "Geothermal Energy Turbine and Well System", and H. B. Matthews et al U.S. Pat. No. 3,910,050, issued Oct. 7, 1975 for a "Geothermal Energy System and Control Apparatus". The five aforementioned patents disclose geothermal energy recovery systems making use of thermal energy stored by subterranean heat sources in hot, solute-bearing well water to generate super-heated steam from a surface-injected flow of clean water; the super-heated steam is then used to operate a turbine-driven pump within the well for pumping the hot brine at high pressure and always in liquid state to the earth's surface, where it transfers its heat in a binary closed loop heat exchanger-vapor turbine-alternator combination for generation of electrical power. Residual brine is pumped back into the earth, while the clean, cooled water is regenerated at the surface-located system and is returned to the deep well pumping system for generating steam and also for lubrication of fluid bearings supporting the turbine-driven pump system. The latter three patents concern a similar system, illustrating improvement features in the form of hydro-dynamic radial and thrust bearings and pressurized liquid bearing lubrication means. A reverse flow deep well steam turbine motor of compact nature is also disclosed, along with features of the surface control and power generation systems.

SUMMARY OF THE INVENTION

The present invention is an improvement over the prior art geothermal energy extraction systems which greatly reduces the initial and operating costs of the apparatus, eliminates certain surface and down-well elements and provides apparatus of reduced complexity and considerably enhanced efficiency. Other problems inherent in the prior art apparatus are also overcome, as will be discussed hereinafter.

The invention is a geothermal energy recovery system of reduced cost and improved efficiency that makes use of thermal energy stored in hot, solute-bearing well water during the period that it is pumped upward to the earth's surface through an extended lineal heat exchange element for continuously heating a downward flowing organic working fluid. The added energy of the latter fluid is then used within the well for operating a turbine-driven pump for pumping the hot, solute-bearing well water at high pressure and always in liquid state to the earth's surface, where it is reinjected into the earth by a sump well. The temperature difference between the upward flowing brine and the downward flowing organic working fluid is maintained finite in a predetermined manner along the length of the subterranean extended heat exchange element. After driving the deep well turbine-driven pump, the organic fluid arises in a thermally insulated conduit for driving electrical power generation equipment, generally located at the earth's surface, and after which it is then returned into the well for reheating as it travels downward in the extended heat exchanger.

More specifically, the pressure and temperature of the downward flowing organic fluid increases continuously, due to the gravity head pressure and the heat transfer with the upward flowing brine, respectively, and are manipulated by the apparatus of this invention, such that the specific heat characteristic of the organic fluid may be adjusted to allow maximum heat transfer between the organic fluid and the brine.

BRIEF DESCRIPTION OF THE DRAWINGS

FIG. 12 is an elevation view, partly in cross-section, of an alternative form of the down-well heat exchanger system.

FIG. 13 is an elevation view, partly in cross-section, of one section of the heat exchanger system of FIG. 12.

FIG. 14 is an elevation cross-section of part of the apparatus of FIG. 2.

FIG. 15 is a plan view of the turbine wheel of FIG. 14.

FIG. 16 is a fragmentary view taken along the line 16—16 of FIG. 15.

DESCRIPTION OF THE PREFERRED EMBODIMENTS

Figure 1:
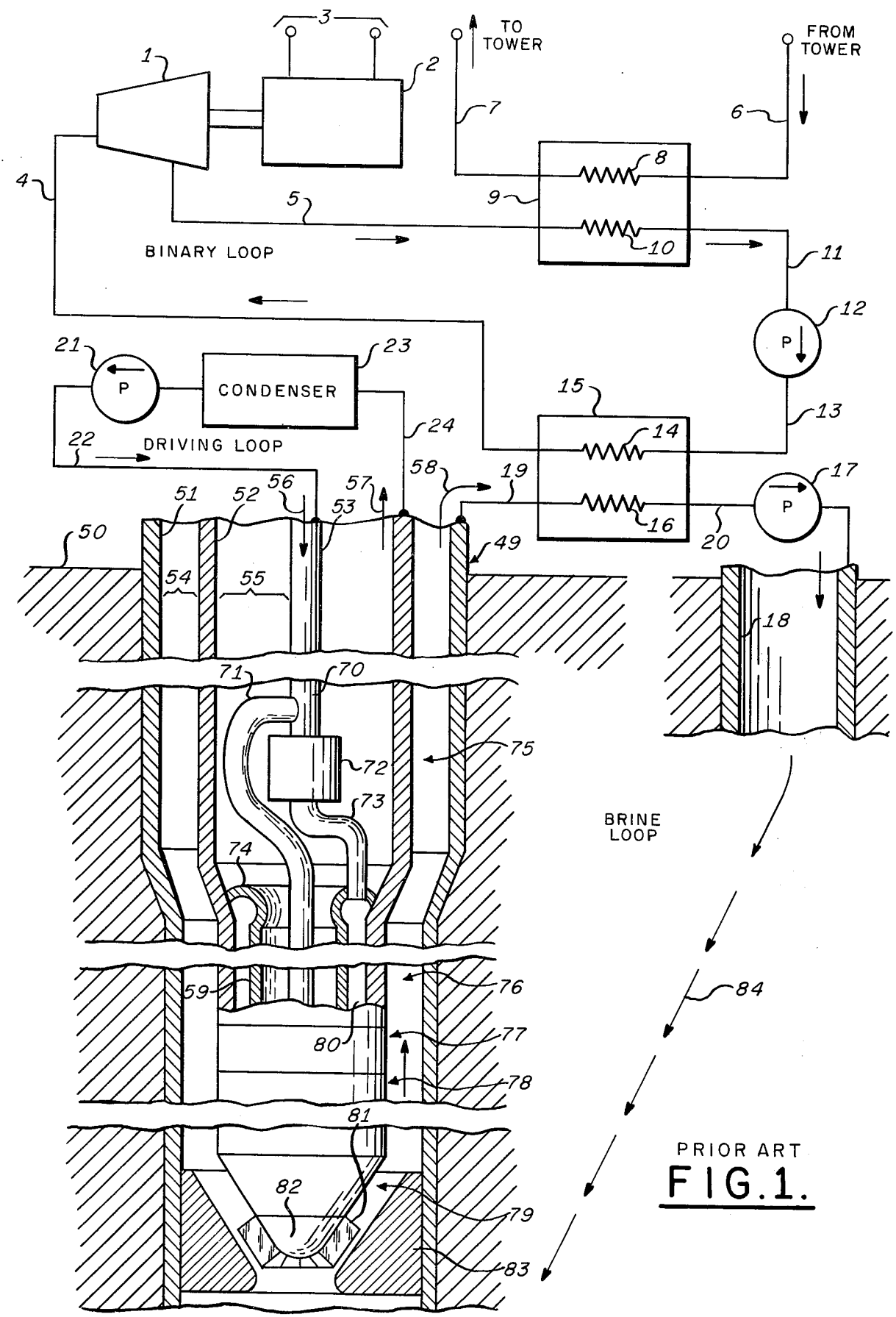
FIG. 1 is an elevation view, partly in cross-section, of a prior art deep well geothermal energy recovery system and of cooperating surface control and power generation apparatus.

FIG. 1 illustrates the general structure and characteristics of the prior art geothermal energy recovery system described in the aforementioned basic Matthews U.S. Pat. Nos. 3,824,793 and 3,898,020 as including a surface energy conversion system and a cooperating geothermal energy extraction system, which latter is immersed in a deep well extending into strata far below the earth's surface, preferably being located at a depth such that a copious supply of extremely hot water under high pressure is reliably available. The deep well apparatus includes an active pumping structure disposed within a generally conventional well casing 51. The configuration of FIG. 1 is seen to include a well head section 49 located partly above the earth's surface 50 and extending downward. At or above the subterranean source of hot, high pressure water, extensions of the well piping join a regulator and steam generator input section 75. The steam generator section 76, a steam turbine motor section 77, a supporting rotary bearing section 78, and a hot water pumping section 79 follow in close cooperative succession at increasing depths.

The well casing 51 extends downward from the earth's surface 50, surrounding in generally concentric relation an innermost steel pipe 53 forming an interior conduit for supplying a flow in the sense of arrow 56 of relatively cool pure water at the bottom of the well. A second relatively larger pipe 52 surrounds pipe 53 and provides a conduit 55 extending from the well head 49 to the turbine motor section 77, permitting turbine exhaust steam to flow in the sense of arrow 57 to the earth's surface 50, where the steam then flows through the extension pipe 24 into condenser 23. The condensed steam is then pumped by a conventional surface pump 21 via pipe 22 for return into the well within the central inner pipe 53.

It will be seen from FIG. 1 that the relatively clean, cool water is pumped down the inner pipe 53 to the region of pipe tee 70. At tee 70, the downward flowing water is divided between two branch paths. As is described in detail in the aforementioned basic Matthews patents, a first branch path feeds clean lubricating water through pipes 53 and 71 for lubricating a system of bearings within the bearing system section 78. The second branch path feeds a portion of the clean water through pressure regulator 72 and via distribution pipe 73 to the input manifold 74 of a steam generator 80 formed as an annular chamber between the generally concentric walls of pipes 52 and 59. Accordingly, high pressure steam is generated and delivered to drive a steam turbine motor located within turbine motor section 77. The function of the turbine motor located at 77 and supported on the rotary bearings provided in bearing section 78 is to drive a hot water pump located at section 79. Hot, high pressure water is thus impelled by the rotating pump vanes 81 upward between the rotating conical end 82 of the pump shaft and an associated pump shroud 83; the hot geothermal water is pumped upward in the sense of arrow 58 at high velocity in the annular conduit 54 between pipe 52 and the well casing 51, thus permitting use at the earth's surface of the geothermal energy contained in the water. The hot water is pumped upward usually in the form of a brine, to the earth's surface 50, always at a pressure sufficient to prevent it from flashing into steam and thus preventing it from undesirably depositing dissolved salts at any point of potential flashing. As the well water is pumped upward, heat is transferred from it through the walls of pipe 52 at steam generator 80 for enabling the formation of energetic dry steam.

The hot geothermal water pumped to the earth's surface within conduit 54 is coupled by pipe 19 into heat input element 16 of the conventional heat exchanger device 15 for heat extraction by an organic fluid flowing in the cooperating conventional heat exchanger output element 14. The cooled geothermal water is pumped by pump 17 to be returned through pipe 20 to a location deep within the earth by the reinjection well casing 18 along with its dissolved salts. The reinjection well formed by casing 18 may be located remotely from the geothermal well of casing 51, but will preferably be arranged to permit flow of the reinjected water through pervious earth strata toward the geothermal heat source utilized by the geothermal well, as indicated by arrows 84.

The binary surface energy conversion system removes energy from heat exchanger 15 to operate the conventional surface-located vapor turbine motor 1. For this purpose, a conventional organic fluid affording enhanced Rankine cycle operation may be supplied by pump 12 via pipe 13 to heat exchanger element 14, wherein it is converted to energetic vapor that is coupled in pipe 4 to the input stage of the conventional multi-stage turbine 1. After performing useful work therein, the turbine exhaust vapor flows via pipe 5 through input element 10 of a heat exchanger 9 and then flows as a condensed liquid through pipe 11 to pump 12 for recycled use. Condenser 9 may be cooled by a flow of cool water from a cooling tower (not shown) through pipe 6, heat exchanger element 8, and pipe 7. Thus, the combination utilizes energy found in a deep geothermal well for efficient generation of electrical power at terminals 3 of a conventional alternator 2 turned by the organic vapor-driven surface turbine motor 1.

The prior art concept represented in FIG. 1 is characterized as having three operating loops:

(1) a geothermal Brine Loop involving conduit 54, heat exchanger element 16, pump 17, reinjection well 18, and the pervious strata 84 connecting the bottoms of the wells, (2) a primary energy conversion Binary fluid Loop involving heat exchanger element 14, turbine motor 1, condenser element 10, pump 12, and pipe 13, and (3) a down-well pump Driving Loop involving flow of clean water through pipe 53, regulator 72, steam generator 80, the steam turbine motor in section 77, conduit 55, pipe 24, condenser 23, pump 21, and pipe 22.

In the operating Brine Loop, the geothermally heated brine normally enters the well below the pump section 79 at a location, for example, 6000 feet below the earth's surface and at a typical temperature of 300° F. and a pressure high enough to reach at least 1000 feet or so from the earth's surface 50 with still enough excess pressure above its saturation pressure to prevent cavitation and flashing at the pump vanes 81. The deep well pump at section 79 adds enough pressure (perhaps 200 p.s.i) to lift the geothermal well brine above the earth's surface 50, still with sufficient pressure above the saturation pressure to prevent flashing and cavitation in passage toward the reinjection booster pump 17. In the upward or upwell transit by the geothermal brine, it transfers enough heat to steam generator 80 in the Driving Loop to drive the turbine motor in section 77. The geothermal brine then arrives at the primary heat exchanger 15 at a temperature, for example, of 280° F. Booster pump 17 is provided to assist the flow of the geothermal brine through the heat exchanger element 16 and to add sufficient pressure thereto to dispose of the brine in a remotely located reinjection well 18, perhaps at about 250 p.s.i. As noted, the reinjection well is in effect connected to the bottom of the geothermal well by water-pervious strata so that the brine is reheated and may be continuously recycled.

Figure 3A:
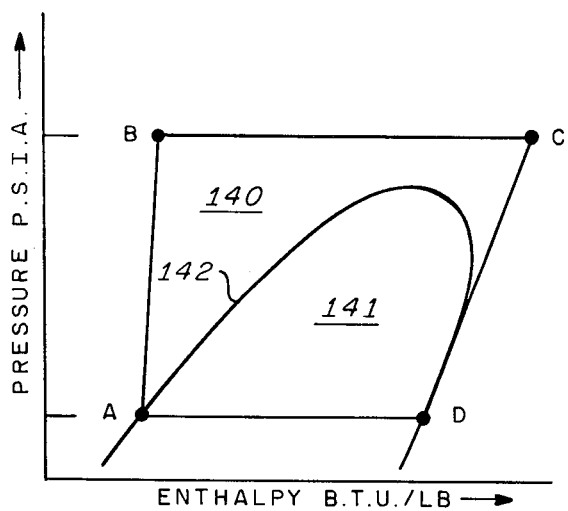
FIGS. 3, 4 and 5 are graphs useful in explaining the operation of the present invention.
Figure 3B:
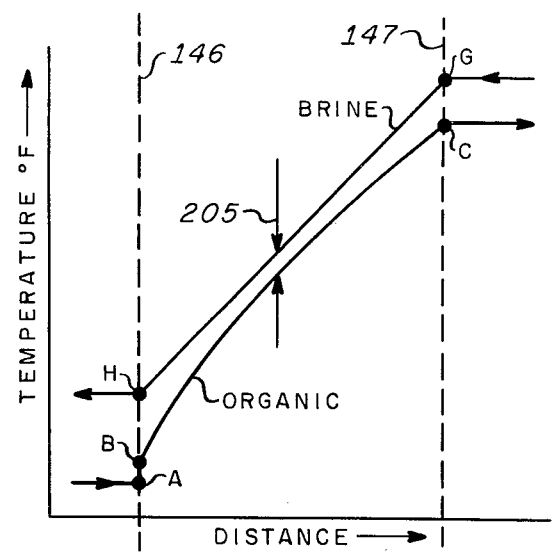

The primary energy conversion Binary Loop may be represented by the conventional organic Rankine cycle A B C D A of FIG. 3a in a diagram depicting pressure P versus enthalpy h. In this diagram, the area 141 bounded by curve 142 defines the dual phase region of the organic fluid. It is noted, moreover, that the organic Rankine cycle A B C D A enters this dual phase region during the portion of the cycle D A, i.e., during the cooling of the organic fluid in the heat exchanger, condenser 9 and prior to the pressurization thereof (path A B) by pump 12. FIGS. 3a and 3b will be discussed in connection with the operation of the prior art system of FIG. 1; it will be understood that FIG. 3b illustrates curves of respective temperature within the brine and organic fluids as they traverse the heat exchanger 15 in counter flow relation. The dotted vertical line 146 represents the location of the input of the organic material and of the output of the brine; the dotted vertical line 147 represents the location of the output of the organic material and the input of the brine with respect to heat exchanger 15, for example. The horizontal coordinate in FIG. 3b therefore represents distance along the heat exchanger.

The path A B of FIGS. 3a and 3b, as indicated above, represents an increase in pressure of the organic binary fluid with relatively small but mutually commensurate enthalpy and temperature changes, as provided by feed pump 12. The feed pump 12 adds sufficient pressure to the organic fluid such that the state or regime of the organic fluid will stay well above the dual-phase region 141 when heat is transferred thereto as indicated by path B C (FIGS. 3a and 3b). With only a slight drop in pressure being experienced as a result of flow losses through the heat exchanger 14, the path B C represents constant pressure heating of the organic fluid such that the enthalpy and temperature thereof are significantly increased.

The path C D depicts the drop in pressure of the organic fluid as the organic vapor expands in turbine 1. It is noted that considerable enthalpy is dropped during the corresponding pressure drop to point D, and, more importantly, that point D is chosen desirably close to the dual-phase boundary 142. The positioning of point D desirably close to curve 142 is substantially governed by the following: if D is inside curve 142, there is some droplet erosion of the turbine 1 and energy loss; and, if D is too far outside of curve 142, significant thermal energy is lost and efficiency is unnecessarily reduced. Accordingly, in order to obtain maximum efficiency of the primary energy conversion cycle A B C D A, point D which represents the pressure-enthalpy condition of the binary fluid at the outlet of the turbine is chosen desirably close to binary fluid dual phase boundary 142. The cycle is closed by the path D A, which corresponds to the action of heat exchanger or condenser 9 in condensing the low pressure vapor to a liquid by dropping the enthalpy h back to its original value along a substantially constant pressure path through the dual state region 141. In summary, it is seen that the thermodynamic processes are:

| | |
|---|---|
| (A-B) (FIGS. 3a and 3b) | feed pump working, |
| (B-C) (FIGS. 3a and 3b) | transfer of heat from the brine to the organic working fluid, |
| (C-D) (FIG. 3a) | expansion of the organic working fluid in the turbine, |
| (D-A) (FIG. 3a) | condensation of the organic fluid, and |
| (G-H) (FIG. 3b) | extraction of heat from the brine during the process (B-C). |

For a typical, but merely representative set of operating conditions, with allowance for losses, the pressure and temperature situations at the various alphabetical points of FIGS. 3a and 3b may be those of Table I:

TABLE I

| | Pressure P.S.I.A. | Temperature ° F. |
|---|---|---|
| A | 33 | 80 |
| B | 930 | 90 |
| C | 900 | 330 |
| D | 38 | 85 |
| G | 175 | 350 |
| H | 150 | 127 |

The temperature difference $\Delta$ T(H-B) is 37° F.; $\Delta$ T(H-A) is 47° F. $\Delta$ T(G-C) is 20° F.; and there is a 20° F. mean effective temperature difference. It will further be observed, in the system of FIG. 1, that the heat capacity of the working fluid, or dQ/dT, is a slightly increasing function of temperature of the working fluid. On the other hand, the effective heat capacity of the brine is characteristically almost constant throughout its operating temperature range in the system of FIG. 1. These particular thermal characteristics lead to design restrictions requiring compromise choices in the design of the prior art (FIG. 1) apparatus connected with the well known pinch effect often present in heat exchangers. As will be further discussed, the pinch effect renders such a heat exchanger inoperative should the temperature difference bounded by arrows 205 in FIG. 3b become zero.

Figure 2:
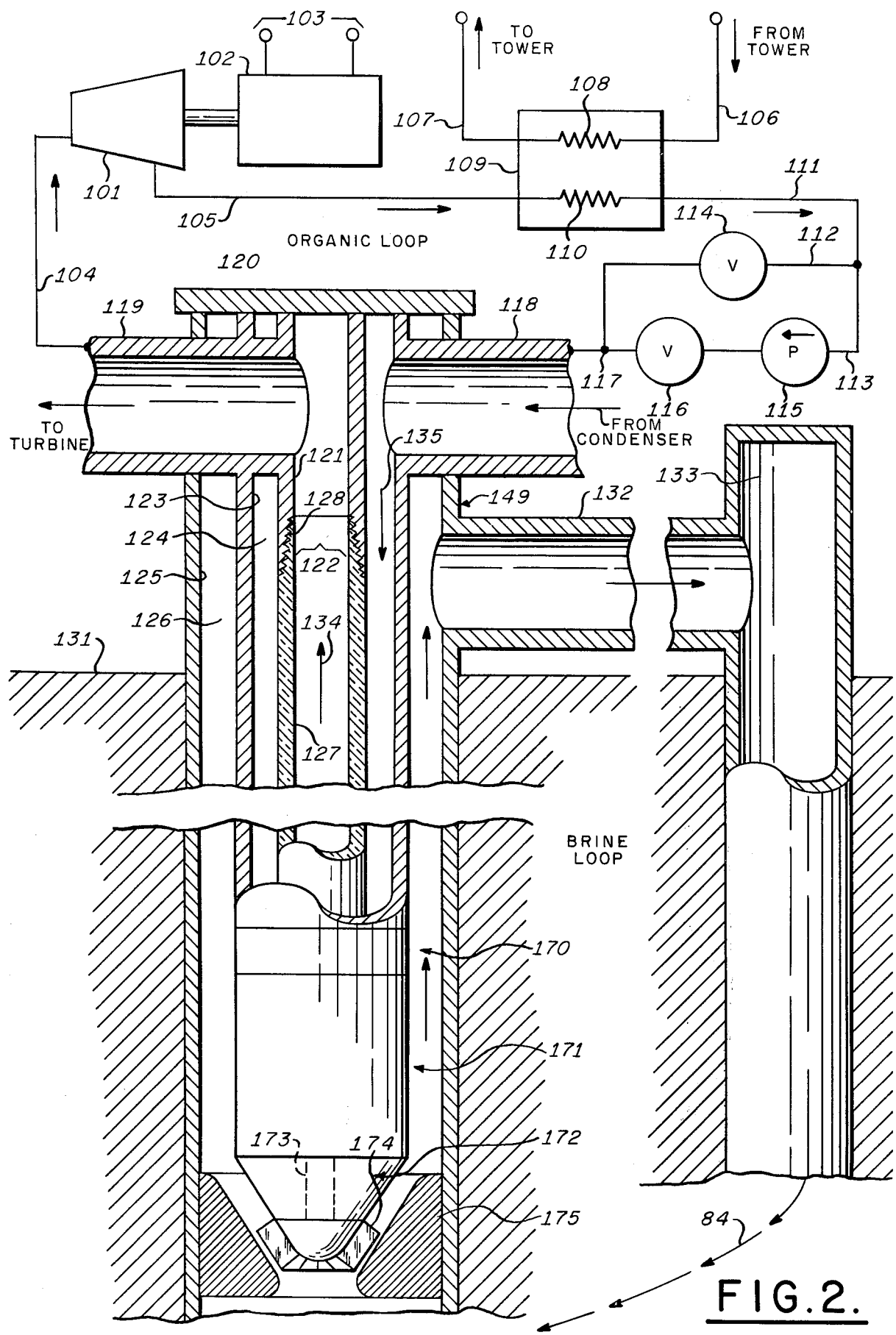
FIG. 2 is an elevation view, partly in cross-section, of the novel geothermal system of the present invention.

The novel geothermal gravity head cycle system of FIG. 2 is intended also to overcome the foregoing design problem. FIG. 2 presents a simplified surface energy conversion system cooperating with a less complex and more efficient geothermal energy extraction system, the latter again being disposed in a deep well extending into strata providing a copious supply of geothermally heated water or brine under relatively high pressure. The deep well apparatus again includes active brine pumping apparatus located within a well casing 125 below the pressure level of the brine at which flashing would take place. The configuration of FIG. 2 again includes a well head section 149 located partly above the earth's surface 131 and extending downward. Toward the geothermal source, extensions of the well piping directly join a fluid turbine motor section 170, a supporting rotary bearing section 171, and a hot water pumping section 172 following in close succession at increasing depths.

The well casing 125 extends downward from the surface capping or header plate 120, surrounding in generally concentric relation a relatively large pipe 123 cooperatively forming a conduit 126 for permitting upward flow of the hot geothermal brine always in liquid state. An annular conduit 124 is formed between pipe 123 and an innermost pipe 121 for permitting downward flow of an organic fluid in heat transfer relation with the upward flowing brine. A further conduit 122 is formed by pipe 121 for permitting upward flow of the heated organic fluid.

Figure 4A:
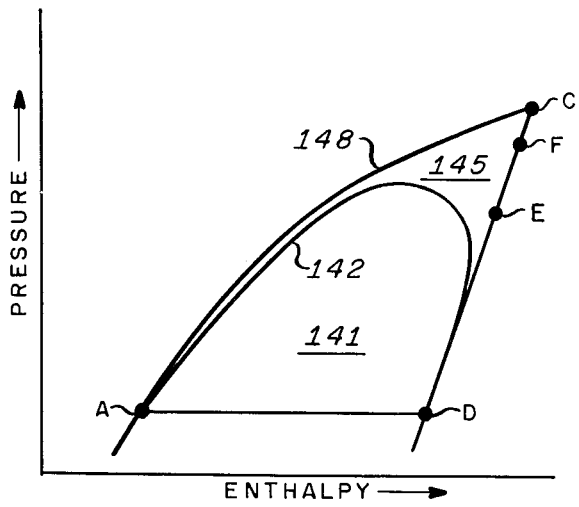
Figure 5A:
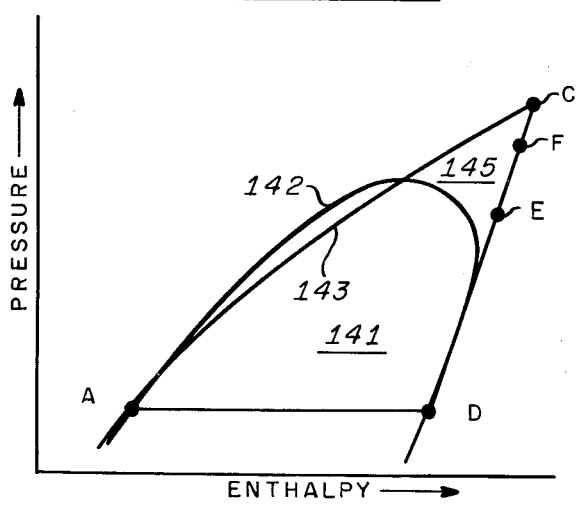

Intensive heat exchange is achieved through the walls of pipe 123 between the upward flowing hot geothermal water and the down flowing working organic fluid which is heated in conduit 124 to a supercritical state as represented by point C of FIGS. 4a, 4c and 5a corresponding to point C of FIG. 3a. On the other hand, in the preferred embodiment, heat flow between the downward flowing heated working fluid within annular conduit 124 and the upward flowing working fluid in the innermost conduit 122 is substantially diminished. For this purpose, only a small portion of pipe 121 may be made of metal, the major portion of the conduit in the preferred embodiment is defined by a pipe constructed of a thermally insulating material. Such an insulating pipe is indicated in FIG. 2 as pipe 127 and as joined to the well head metal inner pipe 121 in a conventional manner, as by threaded joint 128. The insulating pipe 127 may be similarly attached at threaded joint 129 to a metal pipe 130 located within the fluid turbine motor section 170 of FIG. 14, yet to be described. Pipe 127 may be constructed in a conventional manner of molded refractory materials cast with a suitable binder and may contain glass, asbestos, or similar fibers. Alternatively, pipe 127 may be a steel pipe with a layer of conventional powdered thermal insulator material sprayed or otherwise bonded to one or both of its cylindrical surfaces in a conventional manner. At the low end of the operating temperature scale, re-enforced plastic pipes are suitable.

With the pump in pump section 172 operating, geothermal fluid or brine is propelled upward in conduit 126 always in liquid state by the action of pump vanes 174 driven via shaft 173 by the fluid turbine motor of section 170. During its ascent within conduit 126, there is intensive heat transfer through the walls of pipe 123 into the down-flowing working fluid in conduit 124. The geothermal brine flows upwardly in conduit 126 and out through branching outlet pipe 132 at the earth's surface 131, thus being conducted in donsiderably cooled form to a reinjection well 133 similar to well 18 of FIG. 1. Accordingly, the energy extraction cycle may be continuously repeated.

The organic working fluid introduced by branching surface pipe 118 into conduit 124 flows downward in the well between the thermally conductive pipe 123 and the thermally insulative pipe 127 in considerable volume so that a major part of the geothermal energy is transferred to the working fluid by the time it reaches the turbine motor of section 170 in supercritical state. After furnishing energy for driving the turbine, shaft 173, and vanes 174 of the brine pump, the partially cooled fluid flows upward in conduit 122 and out through series branching pipes 119, 104 to the input of a conventional multistage vapor turbine 101. In this manner, energy is provided by the vapor forming at the input nozzles of turbine 101 to drive the surface-located alternator or generator 102 for supplying electrical power at output terminals 103.

The vapor consequently appearing at the output stage of turbine 101 and flowing through pipe 105 is reconverted into a liquid by the action of condenser element 110 of condenser 109. Cooling of condenser 109 is provided by flow of water, for example, from a cooling tower (not shown) through pipe 106, condenser element 108, and back to the tower through pipe 107. In normal operation, the organic working fluid flows through pipes 111, 112, the open valve 114, through tee 117, and into branching pipe 118 for recycling. Valve 114 will be closed only in unusual circumstances, such as, for example, as in start-up of the system; then, valve 116 is instead opened and pump 115 is operated to provide flow through pipe 113, pump 115, valve 116, and tee 117 and thus to afford sufficient pressure to start the down-well turbine motor of section 170, after which normal operation is continued with valve 116 closed while valve 114 is reopened.

In significant contrast with the prior art concept of FIGS. 1, 3a, and 3b, the new configuration is characterized by only two operating loops:

(1) A geothermal Brine Loop involving conduit 126, pipe 132, reinjection well 133, and the pervious strata 84 connecting the bottoms of the wells, and (2) an entirely distinct loop which will be called herein the Organic Loop involving flow of organic fluid through pipes 111, 112, 118, well conduit 124, the fluid turbine motor in section 170, conduit 122, pipes 119, 104, vapor turbine 101, and heat exchanger 110. In the operation of the Brine Loop, the brine solution is pumped upward from the bottom of casing 125 through the down-well pump at section 172 and has pressure added to it to move it above the earth's surface 131. Unlike the prior art apparatus of FIG. 1, the brine transfers substantially all of its available heat through the walls of the lengthy heat exchanger 123 into the organic fluid in conduit 124 of the Organic Loop. Accordingly, the brine arrives at the earth's surface 131 at a relatively lowered temperature, for example, such as 120° F. to 150° F., where the brine in the well source is at about 300° F., depending in a conventional manner upon the temperature of the ultimate heat sink. In contrast to the operation of the prior art system wherein the rising geothermal brine substantially retains its initial temperature, the temperature of the brine in conduit 126 of this invention is continuously reduced and the pressure is also continuously dropping as the brine rises to the surface. Accordingly, in this invention there is no need for the downwell pump of section 172 to add significant pressure to prevent the brine from flashing, and all of the work done by the downwell pump goes simply into overcoming flow friction losses. Further, the booster pump 17 of FIG. 1 is eliminated. In addition, other initial expenses and operating costs are removed; for example, the primary Binary Loop heat exchanger 15 of the FIG. 1 system is eliminated, its function being taken over by the relatively simple and more efficient heat exchanger formed by the well conduits 124, 126 which must, in any event, be present to transport their respective fluids.

Figure 4B:
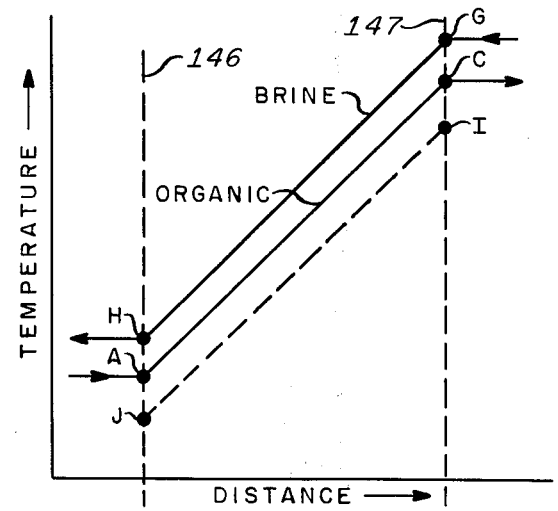

The operation of the Organic Loop of FIG. 2 may be discussed in connection with the diagrams of FIGS. 4a and 4b, it being understood that FIG. 4a is analogous to FIG. 3a and that FIG. 4b is analogous to FIG. 3b. The novel Organic Loop of this invention is represented in FIG. 4a by the loop A C F E D A. Beginning at the output of condenser element 110 corresponding to point A of FIG. 4a, the working fluid flows downward in conduit 124 between the heat exchanging pipe 123 and the thermally insulating exhaust pipe 127. As the organic fluid flows downwardly in conduit 124, its pressure increases continuously due to the continuous increase of the gravity head at increasing depths within the well; moreover, the temperature and enthalpy of the organic fluid also continuously increase, during the transit through conduit 124, as a result of the heat transfer from the upwardly flowing geothermal brine. Thus, in the preferred embodiment of this invention, the organic fluid is simultaneously pressurized and heated in a substantially continuous manner as represented by curve 148 of FIG. 4a. Curve 148 of FIG. 4a indicates that the fluid in conduit 124 is pressurized and heated in a continucus manner and, also, in a manner such that organic fluid arrives at the turbine motor in section 170 with the maximum temperature, pressure and heat content (enthalpy), as represented by the supercritical state at point C of FIG. 4a, obtainable with the physical and geothermal condition of the utilized well. In practice, the curve 148 may be allowed to dip, but only slightly, into the dual-phase area 141, as will be further discussed. The shape of curve 142 is, of course, inherently defined or fixed by the physical nature of the organic fluid, whereas the shape of curve 148 is readily manipulated according to this invention. In general, the shape of curve 148 is adjusted in FIG. 4a so as to avoid introduction of heat into the organic fluid at constant pressure as in the process (B-C) of FIG. 3a. More specifically, curve 148 is manipulated according to this invention such that the organic fluid is continuously heated and pressurized to a supercritical state, represented by point C of FIG. 4a, whereby point D, desirably close to the dual phase boundary 142, is obtainable.

Because pressure and temperature increase together along the path AC of FIG. 4a, the specific heat $dQ/dT$ of the organic fluid remains more nearly constant with temperature than in the cycle of FIGS. 3a and 3b where temperature was increased at substantially constant pressure (B-C). This relatively constant specific heat characteristic can be achieved with a wide range of organic fluids suitable for use in thermodynamic systems, including isobutane, propane, propylene, difluoromethane ($CH_2F_2$), and other commonly used high molecular weight refrigerants of the halogen-substituted hydrocarbon or chlorofluorocarbon type, for example, $C\,Cl\,F_2$–$C\,Cl\,F_2$, $C\,Cl_3\,F$, or $C\,Cl\,F_2$–$C\,F_3$.

The basic characteristics required of the organic fluid in the preferred embodiment of the present invention is that its specific heat characteristic may be manipulated in accordance with the increasing temperature and pressure along path A C such that it substantially matches the substantially constant specific heat characteristic of the geothermal brine solution. With this adjustment of the specific heat characteristic imposed on the selected organic fluid, it is possible according to the invention to achieve an ideal, small, substantially constant, temperature difference between the rising brine solution in conduit 126 and the descending working organic fluid in conduit 124 all along the total length of the heat exchanging pipe 123. With this novel arrangment, a higher maximum temperature may be achieved for the organic fluid as it enters the turbine motor section 170 without the aforementioned penalties inherent in the no longer necessary Brine Loop pump and heat exchanger apparatus used in the prior art FIG. 1 system. Also, substantially more heat may be extracted from the brine, dropping it to a lower temperature. Thus, the risk of pinch effect is substantially reduced if not completely eliminated.

In operation, after being pressurized and heated to a supercritical state (point C of FIG. 4a) as indicated hereinabove, the organic fluid expands to some extent in passing through turbine section 170, giving up a small amount of pressure and enthalpy in actually traversing path C F (FIG. 4a). In the preferred embodiment of the invention, no phase change is involved in the traversal of path C F, so that the fluid remains in a supercritical state. The heated organic fluid then flows upwardly within insulated pipe 127 at a substantially constant, high temperature accompanied by a slight expansion, as represented by path F E. In the corresponding path F E of FIG. 4a, the fluid may incur slight flow losses, and, although point E in FIG. 4a is shown below the supercritical state of the fluid, it may be possible for the fluid to arrive at the surface 131 in a supercritical state. Upon arrival at the earth's surface 131, the heated fluid expands through the power turbine 101, giving up the remaining major portion of its available thermal energy therein. The corresponding path E D of FIG. 4a would be one of constant entropy except for losses, especially in the vanes of turbine 101, which may produce some directional deviation of path E D. The path E D in FIG. 4a (as well as path C D in FIG. 3a) may lie in some proportion outside or inside of the dual phase regime 141 rather than as illustrated, if desired, although efficiency of the system will be affected as previously indicated. The cycle is finally completed along the constant pressure path D A in view of the action of condenser 109 and the cycle then continues to repeat.

As previously indicated, the shape of the curve 148 may be manipulated according to this invention such that the supercritical state represented by point C (FIG. 4a) as governed by the condition set by point D is achieved. For example, FIG. 4a indicates that for an embodiment of this invention curve 148 or, more specifically, the organic fluid does not enter the dual phase region 141 defined by curve 142. In contrast, FIG. 5a indicates that curve 148 may be allowed to dip within the region 141, for purposes to be explained hereinbelow. Furthermore, although the preferred embodiment of the invention indicates that it may be possible for the organic fluid to reach the surface located electrical generating equipment in a supercritical state, FIG. 4c indicates that for certain organic fluids previously indicated, e.g., $C\,Cl\,F_2$–$C\,Cl\,F_2$ and $C\,Cl\,F_2$–$C\,F_3$, known by those skilled in the art as "drying fluids", the upwardly flowing organic fluid will expand in its upward passage and pass through its dual phase region 141 arriving at the surface or entrance to the turbine E in a state other than supercritical. However, it is noted that these organic fluids will in any event expand through the turbine along the path E D, wherein point D is desirably close to the curve 142, as previously indicated. In the representation of FIG. 4c, the organic "drying fluid" is shown wherein the expansion through the turbine section 170, i.e., path C F extends into the dual phase region 142, and the upward transition path F E terminates within the dual phase region. Thus, it is possible for the organic fluid to reach the turbine 101 in other than a supercritical state. Moreover, it is the manipulation of curve 148 along path A C desirably close to or somewhat within the region 141 which is utilized by this invention, as herein explained, to change the heat capacity of the working organic fluid.

In the system of FIG. 2, the pump 12 of FIG. 1 is not required in providing the pressure difference between the points A and C of FIG. 3a. The desired pressure difference is provided in part by the temperature and, hence, the density of the organic liquid in conduit 124 and therefore the increased pressure head of the organic liquid column disposed between heat exchanger pipe 123 and the insulative exhaust pipe 127. The expanding column of organic liquid in conduit 122 produces diminished density, so that a pressure difference is established causing circulation of the organic liquid through turbine section 170 in the sense of arrows 134, 135. Ample energy is available provided flow friction losses are minimized by using relatively large volume conduits. Even though the required well casing 125 may be larger than that used in current oil well practice, the corresponding added cost of a larger diameter well and piping to, say, a 2000 foot depth would be much less than the costs absent in the novel system by eliminating the Binary Loop feed pump 12 and primary heat exchanger 15, the Driving Loop condenser 23 and pump 21, and the Brine Loop booster pump 17 of FIG. 1. Also, the net available amount of electrical power generated for a given brine source temperature and flow rate is significantly higher in the novel FIG. 2 gravity head goethermal energy recovery system.

In summary, it is seen that the thermodynamic processes of the new system, whose characteristics appear in FIGS. 4a and 4b, are:

| | |
|---|---|
| (A-C) (FIGS. 4a and 4b) | transfer of heat to organic working fluid, |
| (C-F) (FIG. 4a) | brine pumping |
| (F-E) (FIG. 4a) | work performed in lifting the organic fluid to the earth's surface, |
| (E-D) (FIG. 4a) | expansion of organic fluid in main turbine, |
| (D-A) (FIG. 4a) | condensation of the organic fluid, |
| (G-H) (FIG. 4b) | extraction of heat from the brine and its transfer to the organic working fluid. |

For a typical, but merely representative set of operating conditions corresponding to those of Table I, but for the FIG. 2 apparatus, the pressure and temperature situations at the various alphabetical points of FIGS. 4a and 4b may be those of Table II:

TABLE II

| | Pressure P.S.I.A. | Temperature ° F. |
|---|---|---|
| A | 33 | 80 |
| C | 900 | 333.5 |
| F | 705 | 321 |
| E | 275 | 240 |
| D | 38 | 85 |
| G | 910 + reinjection pressure | 351.5 |
| H | reinjection pressure | 100 |

The temperature difference $\Delta T(G-C)$ is 18° F.; $\Delta T(H-A)$ is 20° F., and the mean effective temperature difference is 20° F., but the danger of pinch effect intrusion is beneficially removed. It will be observed that heat capacity, being substantially constant along the heat exchanger, that is, a constant as a function of the changing pressure and temperature in the heat exchanger, has made pinch effect involvement impossible. It will be observed that $\Delta T(G-C)$ and $\Delta T(H-A)$ are always positive and finite, i.e., the pinch effect of the prior art has been eliminated.

In the ideal situation achieved according to the present invention, there is a finite, generally constant temperature difference all along pipe 123 of FIG. 2 between the geothermal brine and the working organic fluid. The use of one embodiment of the present invention tends desirably to bend the organic working fluid curve downward away from the brine curve so that a desired but small relatively constant differential temperature difference is readily achieved. The working fluid conditions are thus selected so that the two curves never touch at the pinch point; that is, at the locus of their smallest separation as indicated by arrows 205 of FIG. 3b. Preferably, the two curves are at least essentially parallel as in FIG. 4b, with only a small separation and thus having substantially the same constant slopes, indicating that a constant ratio of specific heats are desired for the geothermal and working organic fluids. In practice, an approximate match of the specific heat value is acceptable (but with loss in efficiency) as long as the curves do not touch, in which situation heat exchange entirely stops. In the prior art system of FIG. 1, it is the threat of the undesired presence of the pinch effect that brings about a difficult design choice, forcing a trade-off, on the one hand, of the size of heat exchanger 15, and, on the other hand, of reduction of the maximum organic working fluid temperature and a higher brine reinjection temperature and, hence, reduced energy transfer to the organic fluid and a lower conversion efficiency. These and consequent inefficiency and cost problems are substantially eliminated according to the present invention.

The novel geothermal gravity head cycle system of FIG. 2 is versatile in nature, and it will be seen that it may successfully operate in additional modes, as will be further discussed in connection with FIGS. 5a and 5b. For example, in a further useful mode of operation, the configuration causes the organic working fluid to have a heat capacity with, in effect, a slightly negative thermal coefficient, as will be further discussed. This mode of operation is achieved using the diagram of FIG. 5a, where the line 143 is forced slightly into the area 141 defined by curve 142; the thermodynamic processes are otherwise generally the same as those discussed relative to the operating mode of FIGS. 4a and 4b. Again, only heat exchange between counter-flowing fluids is to be considered.

Examination of the diagrams shows that if the temperature difference is high at the hot end 147 of the heat exchanger (where the brine enters and the organic working fluid leaves), the organic fluid does not ultimately reach its highest possible temperature, and the cycle efficiency is therefore reduced. A high temperature difference at the cool end 146 results in a higher temperature of the brine discharge and, therefore, less heat flows into the organic fluid. However, heat transfer is proportional to the mean effective temperature differential through the exchanger walls and the greater that differential, the less total heat exchanging surface is required. It will therefore be readily understood that it is desirable to have the lowest possible temperature differentials at the ends 146, 147 of the heat exchanger, but the highest possible differentials otherwise throughout the exchanger.

Figure 5B:
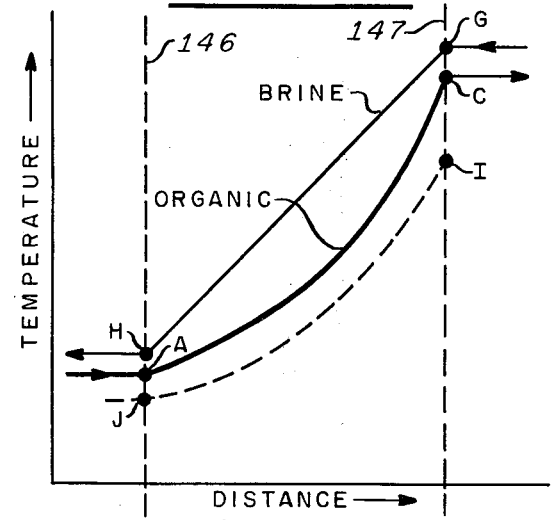

In FIGS. 3b, 4b, and 5b, arbitrary though typical operating conditions have been selected for comparison purposes so that the organic fluid exit temperature from the condenser, i.e., at point A, is always 80° F. Thus, in FIG. 3b, the fluid temperature at the entrance of feed pump 12 of FIG. 1 is 80° F., and in FIGS. 4b and 5b, the temperature of the fluid at the entrance pipe 118 to the downwell heat exchanger is at 80° F. In the conventional Rankine cycle of FIGS. 3a, 3b, the work performed by pump 12 raises the temperature of the organic working fluid and, at a given temperature difference between the brine and the organic fluid, the exit temperature of the brine is higher, lessening the heat injected into the working fluid by the brine. It is to be observed that the temperature between points A and H in FIGS. 4b and 5b is considerably less than that inherent in the spread between points A and H of FIG. 3b. This is, in part, the consequence of the undesirable rise in temperature along path A B in FIG. 3b and in part due to the necessity for minimizing the risk of the pinch event. In the novel gravity head cycle system of FIG. 2, the pump lift work is returned to increase enthalpy throughout the vertical length of the heat exchanger. Thus, more heat is now advantageously extracted from the brine with higher efficiency.

The pinch effect previously mentioned in connection with FIGS. 3a and 3b is caused by the fact that the heat capacity dQ/dT of the brine is almost constant throughout the temperature range of heat exchanger 15 of FIG. 1, whereas the heat capacity of the organic working fluid along the constant pressure path of the Rankine cycle of FIG. 3a is considerably greater at high temperatures than at low temperatures. This difference in heat capacities, as represented by the distinct curve configurations of FIG. 3b, cannot be significantly altered in the constant pressure organic heat addition process of the Rankine cycle.

FIGS. 5a and 5b illustrate the effects of a further improvement over the invention as illustrated and described in connection with FIG. 2, an improvement brough about by changing the form of the heat capacity curve of the organic material so that it has, in effect, a negative thermal coefficient. Such as accomplished by adding heat along a chosen varying pressure path made possible by vertical heat exchange in the novel gravity head cycle. The nature of the diagrams is changed by systematically varying the distribution of heat exchanger area from the bottom to the top of the heat exchanger element.

Thus, the organic working fluid may be caused to pass through the various successive pressure zones at temperatures which can be arbitrarily selected. A heat capacity curve with a zero thermal coefficient eliminates the chance of a pinch effect, as seen in FIG. 4b. This, in turn, permits low differences between brine and organic fluid temperatures at the heat exchanger ends 146, 147, but desirably yields a large mean effective temperature difference across the exchanger. In turn, less heat exchanger area is required, permitting economy of initial investment. Further variation of the system to produce a negative thermal coefficient yields the temperature profile of FIG. 5b, even more immune to the pinch effect and to other problems of the prior art.

Accordingly, further improvement in the novel geothermal gravity head cycle system of FIG. 2 is accomplished by modifying the effective heat transfer through the wall of pipe 123 between conduits 124 and 126. This is accomplished, in one embodiment of the improvement, by installation of heat exchanger elements as shown in FIGS. 6 through 11, where FIGS. 6 through 9 particularly show representative cross-section views taken at successive levels across pipe 123 in FIG. 2. In the configuration, the pipe 123 starts out at the junction with the pump turbine motor section 170, for example, as a simple heat exchanging pipe with no appended elements. At an arbitrary distance above the pump section 170, first and second tapered vertical fins are added to one or both surfaces of pipe 123. In FIG. 9, for example, opposed tapered fins 90 have been affixed to the outer surface of pipe 123. As represented in FIG. 9, the tapered portions of fins 90 have been ended, and these fins extend to the top of the well as shown successively in FIGS. 8, 7 and 6. The cooperating interior fins 91, if present, may be similarly tapered and extended to the well top. The sets of fins 92, 93 in FIG. 9 have just started near the vertical level of the figure, so that a cross-section of their tapered smaller portions is presented.

Figure 6:
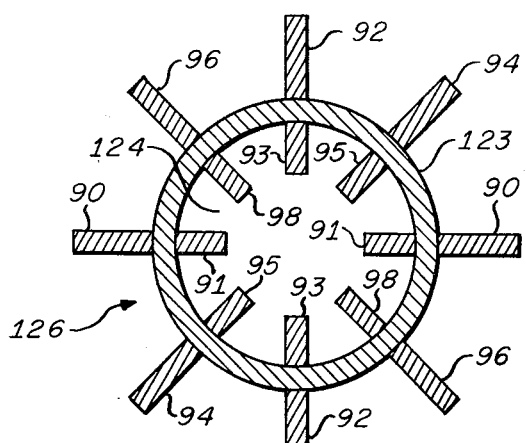
FIGS. 6, 7, 8 and 9 are cross-section plan views at different elevations along the apparatus of FIG. 2 illustrating tapered heat exchanger elements useful therein.
Figure 7:
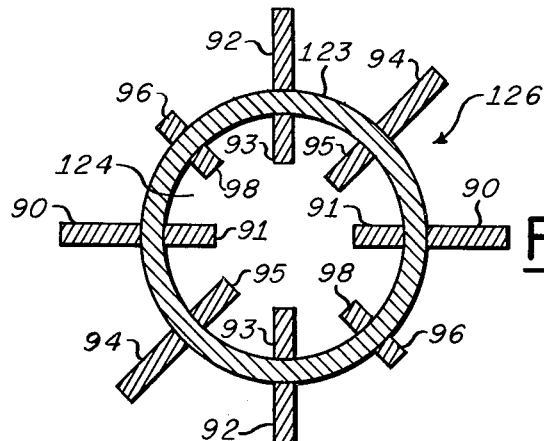
Figure 8:
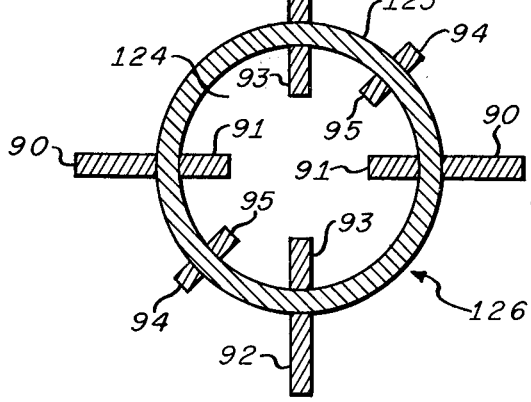
Figure 9:
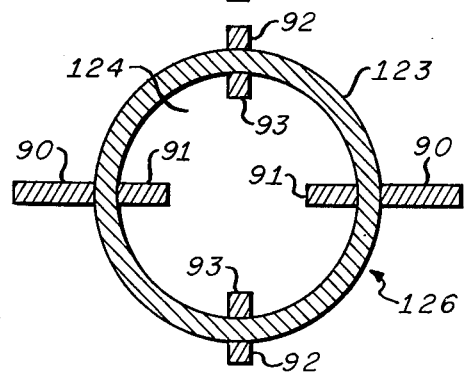
Figure 10:
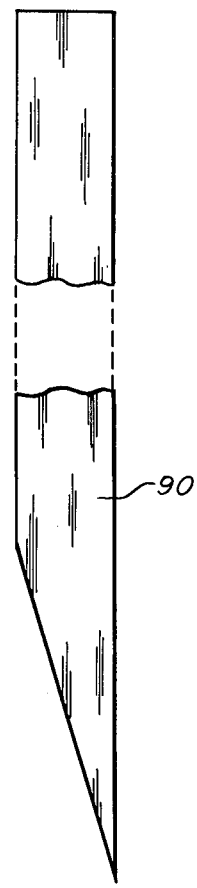
FIG. 10 illustrates a vane type of heat exchanger element in elevation view for use in the apparatus of FIGS. 6, 7, 8 and 9.
Figure 11:
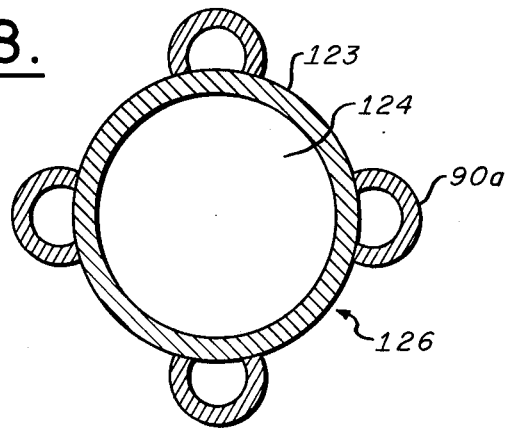
FIG. 11 illustrates a plan view in cross-section of an alternative tapered heat exchanger element.
Figure 17:
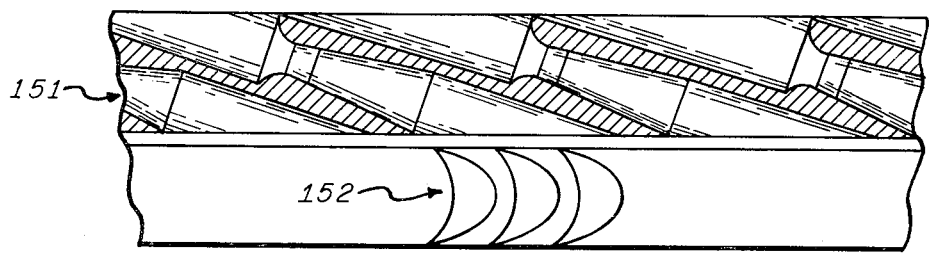
FIG. 17 is a developed drawing of a portion of the turbine apparatus seen in FIG. 14.

At the next higher level in the well seen in FIG. 8, fins 92, 93 have now grown to their full size, the tapers having ended, and they then extend to the top of the well. Additional tapered and opposed pairs of fins 94, 95 appear in FIG. 8, the reduced cross-sectional size indicating that their widths are still expanding at the level of the figure. FIG. 7 indicates the start of still additional tapered portions of fins 96, 98, all of the fins being affixed in heat exchanging relation to pipe 123 and extending as indicated in FIG. 6 to the well head 149. It will be readily understood that many additional fins or other tapered heat exchanging devices may be employed and that they may take any of the variety of configurations well known in the heat exchanger art. The freedom from pinch effect interference may be achieved using known shapes of thermal conductors such as the partial circular cylinders 90a of FIG. 11 whereby thermal conductivity between the downward flowing organic fluid of conduit 124 and the upward flowing brine of conduit 126 may readily be predetermined at any vertical level in the well, as will be apparent to those skilled in the art. It will be further apparent in FIGS. 6 through 9 and 11 that cooperating concentric pipes 125, 127 have been left out of the drawings as a matter of convenience.

The arrangements of FIGS. 6 through 11 may evidently be designed to afford smoothly increasing heat transfer from the down-well pump to the station at the earth's surface 131, if desired. On the other hand, if successive tapers do not overlap, incremental changes may be used to achieve the desired effect. In the further embodiment of FIGS. 12 and 13, another arrangement is used for achieving stepped increasing changes in the rate of heat transfer.

In FIG. 12, it is seen that individual series-connected heat transfer units of the ordinary multiple-pipe type are employed, such as at 250, 257, 260, 262, 266, et cetera. The rising brine column again ascends to the earth's surface 131 in conduit 126 formed in the well casing 125, there to flow out of pipe 132. The cooled working fluid is injected into the system at the earth's surface 131 via pipe 118, from whence it flows downward through the succession of individual heat exchangers 250 to 266 and on. In essence, the multiplicity of individual heat exchanger units now takes the place of the single heat exchanging pipe 123 of FIG. 2. After the working fluid propels the motor in section 170 at the deep-well pump, it again arises to the surface in the interior conduit 122 of the thermally insulated pipe 121.

The rate of heat exchange from the rising brine to the down-flowing working fluid is progressively increased from the bottom to the top of the structure in FIG. 12, for example, by progressively increasing the number of heat exchanging pipes in each successive heat exchanger unit and therefore increasing heat transfer, as previously described. For example only, the exchanger unit 266 shown fragmentally at the bottom of the drawing of FIG. 12 has only two heat exchanging pipes, such as pipe 267, the liquid in these pipes flowing from annular manifold 265 which will be further described in connection with FIG. 13. The heat exchanger unit 262 feeding manifold 265 from manifold 261 has more heat exchanging pipes, such as pipe 263, than are present in unit 266, and therefore unit 262 has increased heat transfer characteristics, three such pipes being seen in the drawing of unit 262. The next heat exchanger unit 260, shown fragmentally, feeds manifold 261 and has a further increased number of heat exchanging pipes, such as pipe 259, than are present in unit 262; therefore, unit 260 transfers more heat than unit 262. The number of pipes and the total heat exchanging areas in each exchanger unit progressively increase toward the well top; the final heat exchanger 250 feeds manifold 256 from the input manifold 249 and has the largest heat transfer area, as by having the greatest number of heat exchanging pipes such as pipe 251. Manifold 256 feeds heat exchanger unit 257 which has a lower heat exchange characteristic than unit 250. In unit 250, nine pipes are seen, while in unit 257, five pipes are seen. It will be understood by those skilled in the art that the arrays of heat exchanging pipes may be arranged in concentric circles or in regular radial fashion and that individual exchanger pipe sizes may be varied within the scope of the invention as long as the desired progressive increase in heat exchange is achieved.

A representative manifold, such as manifold 256 and its input and output heat exchanger pipes is shown in FIG. 13. Manifold 256, having an array of input pipes such as pipe 251 which make up heat exchanger unit 250, serves to couple the downward flowing working fluid into the next lower heat exchanger unit 257 made up of pipes like pipe 258. The manifold 256 surrounds the thermally insulated pipe 121 and resides in the well casing 125 (not shown). Insulated pipe 121 provides the interior conduit 122 and may be lined with insulating material (not shown). A conventional sliding joint at interface 277 is made between upper and lower parts of pipe 121, which interface 277 may be provided with a conventional seal mechanism.

Manifold 256 is composed of separate parts fastened together at the annular pipe-threaded joint 274. The lower portion of manifold 256 includes an apertured header 272 for receiving the heat exchanger pipes (258) of heat exchanger unit 257. Header 272 is connected to pipe 121 in leak-proof fashion. The lower portion further includes a threaded cylindrical shell 275. In a similar manner, the upper portion of manifold 256 includes an apertured header 271 bonded to pipe 121 for receiving the heat exchanger pipes (251) of heat exchanger unit 250. The upper part of manifold 256 also includes a threaded cylindrical shell 273 whose threads match those of shell 275. In this manner, the working fluid flows from the large number of pipes (251) of heat exchanger unit 250 into the relatively fewer pipes (258) of heat exchanger unit 257. Freedom from the pinch effect interference is again afforded but by the use of a series of discrete heat exchanger units 250 through 266 providing incrementally increasing thermal exchange from the bottom to top of the structure.

Figure 18:
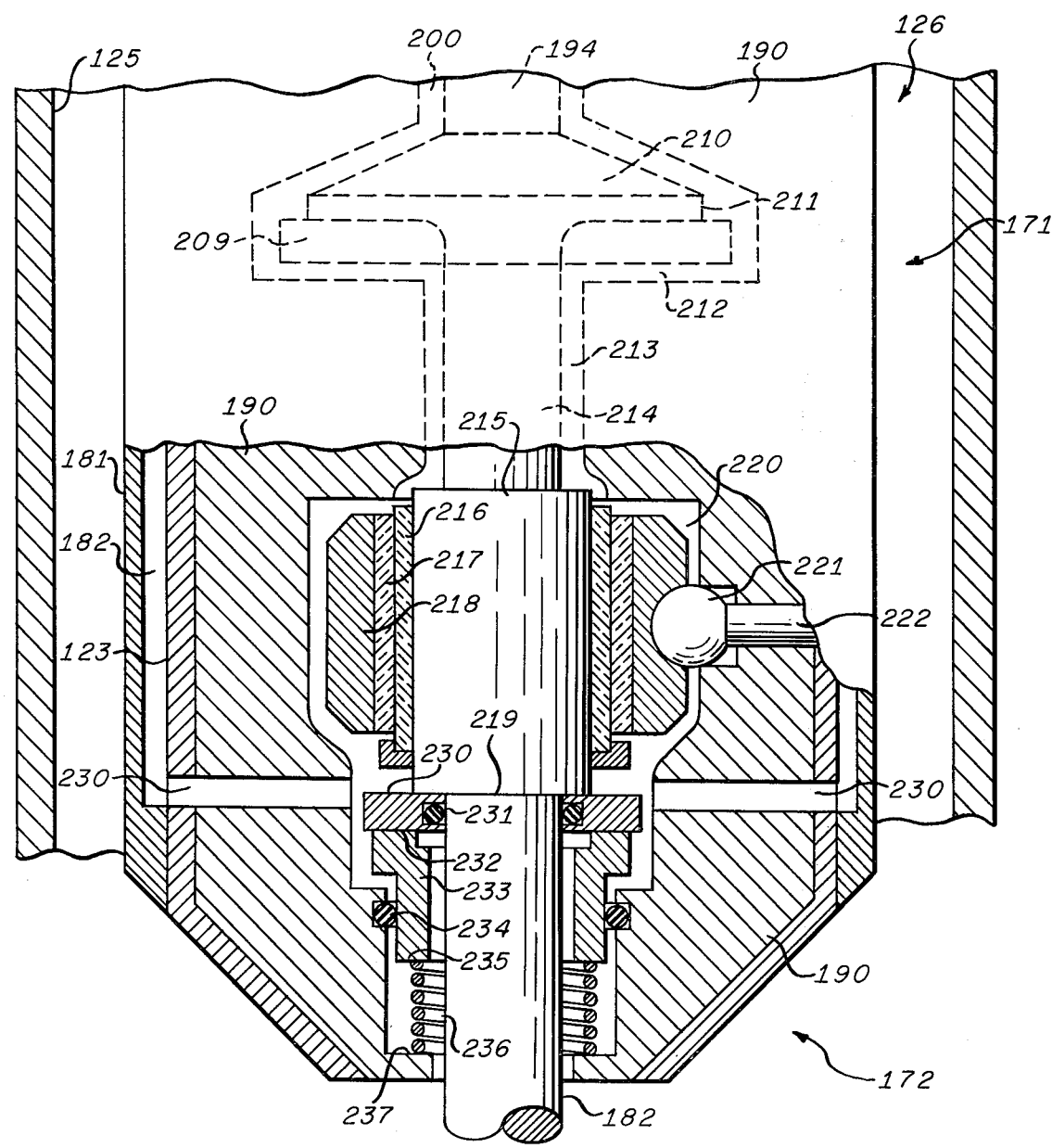
FIG. 18 is an elevation view, partly in cross-section, of a further part of the apparatus of FIG. 2.

A preferred form of the thermodynamically driven turbine motor of the turbine motor section 170 of FIG. 2 is shown in detail in FIGS. 14 through 18. It will be readily apparent that the turbine motor is generally similar in form to the motor employed in the aforementioned Lobach U.S. Pat. No. 3,908,380, though it is modified in a novel way for adapting it to operation in the novel Organic Loop of the present invention. In particular, it is modified for receiving a large volume flow of a working organic liquid remaining in supercritical state, and this same liquid is used to provide lubrication of supporting radial and thrust bearings, rather than surface-injected water. The bearing system, as seen in FIGS. 14 and 18, is further modified to prevent loss of expensive organic liquid into the geothermal brine solution.

Referring particularly to FIG. 14, it is seen that the concentric conduits 122, 124, 126 extend into the fluid turbine section 170. The heated fluid in supercritical state flowing in conduit 124 flows into an array of injection nozzles at 151 of generally conventional design. The nozzles 151 are shown in more detail in the developed view of FIG. 17 and are employed in the usual manner to direct a large volume flow of fluid in supercritical state against the impact blades 152 of the turbine motor. The ring holder 153 bearing the arrays of vanes 152 is affixed in a conventional manner to a wheel rim 155, the latter being a part of a wheel additionally supplied with a set of spokes 156 and a hub 61. Hub 161, when the rotor system is rotating, causes shaft portions 160, 164, and 194 to rotate, hub 161 being securely fastened on shaft portion 160 by washer 159 and a nut 158 secured to a threaded extension 157 of shaft portion 160, for example.

The turbine motor system features an arrangement for redirecting the flowing organic working fluid, which may be in a supercritical state, for upward flow in the insulated inner or exhaust conduit 122. For this purpose, the turbine body block 190 contains an annular, smoothly curved toroidal passageway 163 issuing from the rotating blade array 152 radially inward toward shaft portion 160, at the same time altering direction of fluid flow so that it is caused to flow upwardly. The toroidal passageway 163 is defined by a suitably curved surface 165 cast within body block 190 and by the surface of the opposed annular ring or guide 162. Ring guide 162 may be supported by an array of radially extending vanes 180 which, in addition to supporting ring 162, also tend to redirect the exhaust liquid so that its velocity vector becomes primarily vertical. Accordingly, it is seen that there is formed a smooth-sided toroidal supercritical fluid expansion passageway directing the expanding liquid after it exits the array of blades 152 until it passes through the spokes 156 of the turbine motor wheel. The passage of the working organic liquid between spokes 156 is facilitated generally as shown in FIGS. 15 and 16 and as described in the aforementioned Lobach U.S. Pat. No. 3,908,380 for passage of facilitating steam through a generally similar turbine wheel. Again, spokes 156 are individually tilted with respect to the direction of rotation of rim 155 so that their effect at the selected rotational speed is essentially neutral, the angle of incidence of spokes 156 with respect to the direction of flow of the working liquid again being such that they neither add energy nor subtract energy from the liquid stream flowing upward in conduit 122. In this manner, the need for an additional upwardly oriented space-consuming conduit outside of the hydrodynamic turbine motor is desirably avoided.

FIGS. 14 and 18 illustrate the fluid bearing system for supporting shaft portion 160 and the liquid turbine motor within body block 190; the system includes an upper radial bearing (FIG. 14), a thrust bearing (FIG. 18), and lower radial bearing. The upper radial bearing of FIG. 14 may be of conventional nature or may be a bearing substantially like the tilting pad arrangement of the aforementioned Nichols et al U.S. Pat. No. 3,905,196 in which the shaft portion 189 is surrounded by a hollow cylinder 191 of aluminum oxide affixed to the shaft. In the usual instance, three independent tilting pad bearing surfaces cooperate with the bearing surface of the aluminum oxide cylinder 191, a typical construction employing a fastener including a pad positioning shaft 203 which resides in a bore in body block 190. Pad positioner shaft 203 is located according to the setting of radially adjustable threaded portion 198, shaft 203 accommodating a hardened steel sphere 196 partially residing in a counterbore. Sphere 196 projects into the interior of body block 190, where it thrusts against a mating depression in the bearing support block 193. To its inner arcuate surface is affixed an arcuate sector 192 made of aluminum oxide. The sector 192 and cylinder 191 have contiguous bearing surfaces between which resides organic working fluid as a thin lubricant film, as will be described. In practice, three similar tilting pad bearings are used in the radial bearing fully to establish the actual position of shaft portion 189. It will be evident that the lower radial bearing system of FIG. 18 employing shaft bearing portion 215, alumina cylinder 216, alumina sectors such as 217, bearing block supports such as 218, spheres such as 221, and pad positioning shafts such as 222, may duplicate that of FIG. 14.

Between the two radial bearing units associated with shaft portions 189 and 215 is located a thrust bearing system shown in dotted lines and which may be generally the same as that additionally disclosed in the aforementioned Nichols et al U.S. Pat. No. 3,905,196. The tilting pad thrust bearing system includes, for example, an enlarged and tapered portion 210 for supplying a horizontal interface element 211. The lower or thrust surface of element 211 may be constituted of a flat ceramic ring. The ring 209 schematically represents, for example, the multiple tilting pad thrust bearing system of the Nichols et al patent having plural ceramic bearing surfaces cooperating with the lower or bearing surface of element 211. The bearing surface of element 211 and the horizontal bearing surfaces of the tilting pads cooperate in determining the vertical position of shaft portions 194, 214, 215, as is also discussed in the Matthews U.S. Pat. No. 3,910,050.

To permit the second use of the organic working fluid for the purpose of lubricating the bearing system, a novel fluid system is employed. The feed system also assures that none of the expensive organic working fluid is lost from the pumping system into the hot rising brine solution and that there is no entry of brine into the bearings. As seen in FIG. 14, a sampling channel 179 connects with toroidal expansion chamber 163 and supplies organic working fluid after it passes through impact blades 152 into a manifold 182 defined by a pipe or annular sheet 181 and downward into FIG. 18 to the radially disposed channel 230 found within body block 190. The organic fluid passes through channel or channels 230 into a cavity 220 surrounding the lower radial bearing at shaft portion 215. There, the interfaces between alumina cylinder 216 and bearing pads 217 are bathed in the organic fluid and lubricated as the fluid passes upward through channel 213 into the thrust bearing associated with the cooperating elements 209, 210, 211. Flowing through series channels 213, 212, 200, it similarly lubricates the associated mating thrust bearing surfaces.

Flowing upward next through the annular channel 200 around shaft portion 194 in FIG. 14, the organic fluid emerges into the cavity 199 surrounding the upper radial bearing at shaft portion 189, lubricating the contiguous surfaces of bearing elements 191, 192. Finally, the fluid is pumped upward by the simple screw pump 183 through annular channel 184 and is exhausted into the expanded organic fluid being directed upward to the earth's surface 131 through conduit 122. In this manner, the several bearings are lubricated, permitting their reliable long life operation.

Loss of the expensive organic working fluid is prevented and the corrosive brine well water is excluded from the body block interior by the face seal found in FIG. 18 below the radial bearing at shaft portion 215. The lower face 219 of the enlarged shaft portion 215 bears against the upper face of an apertured ring 230. Supplied with an O-ring 231 engaging the cylindrical surface of shaft portion 182, ring 230 tends to rotate with the shaft. Ring 230 forms a conventional pressure balanced seal with the upper surface 232 of a stationary portion 233 of the seal. Passage of organic fluid downward is further eliminated by an O-ring 234 captured within a groove in body block 190 and engaging the outer cylindrical surface of stationary seal portion 233. A helical spring 236, affixed at its lower end at 237 to body block 190, is affixed at its upper end to the base 235 of stationary seal portion 233. Thereby, elements 230 and 233 are held in contiguous relation, their interface 232 also being lubricated by the working organic fluid. Alternatively, a spring bellows hermetically sealed to surfaces 235 and 237 may be employed in lieu of spring 236. O-ring 234 may be found unnecessary in the latter construction.

Accordingly, it is seen that the invention is a geothermal energy recovery system of improved efficiency that makes use of thermal energy stored in hot, solute-bearing well water as it is pumped upward to the earth's surface through an extended lineal heat exchange element for continuously heating a downward flowing organic fluid to a supercritical state. The increased energy of the organic fluid is used deep in the well for operating a thermodynamic turbine-driven pump for pumping the hot, solute-bearing well water at high pressure and always in liquid state to the earth's surface, where it is reinjected into the earth. The temperature difference between the upward flowing brine and the downward flowing organic fluid is controlled in a predetermined manner along the subterranean extended heat exchange element. After driving the deep well turbine-driven pump, the organic fluid arises to the earth's surface in a thermally insulated conduit; at the earth's surface, electrical power generation equipment is driven by the organic fluid, after which it is returned into the well for reheating during its transit through the extended heat exchanger.

The down-well apparatus of the novel gravity head geothermal system is considerably simplified with respect to that of the prior art, since the incorporation of a down-well pressure regulator and steam generator is avoided and the rising hot brine is used directly in ascending the well itself more efficiently to exchange heat in an extended lineal heat exchanging configuration that avoids introduction of heat into the binary fluid at constant pressure. The invention achieves an ideally small and substantially constant temperature difference between the rising brine solution and the descending organic working fluid along the total length of the extended heat exchanger. Thus, a pipe used simply as a conduit in the prior art system beneficially plays a dual role, and may now serve also as an efficient extended heat exchanger. The down-well pump need only overcome flow friction losses in the brine pipe and the electrical power generated at the earth's surface for a given brine source temperature and brine flow rate is significantly increased. The matched thermal characteristics of the brine solution and the selected cooperating organic working fluid are such that highly efficient thermal energy exchange is permitted. Further, the initial and operating cost and the complexity of the surface equipment are also greatly reduced, since significant elements of the prior art system are no longer required.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. The method of transferring thermal energy from an interior hot region within the earth for utilization adjacent the surface of said earth including the steps of:
   conveying a first liquid initially in a relatively cool state from a first station adjacent said surface of said earth to a second station within said earth,
   employing said thermal energy for converting said first liquid into supercritical state during transit from said first station to said second station,
   employing said first liquid in supercritical state for driving pump means at said second station,
   employing said pump means for pumping a second liquid from said interior hot region to said first station at a pressure retaining said second liquid always in liquid state,
   conveying said first fluid after driving said pump means in thermally insulated relation with respect to said second liquid to said first station, and
   abstracting thermal energy from said first fluid at said first station for performing useful work.

2. The method described in claim 1 wherein the step of conveying said first fluid further includes conveying said first fluid in supercritical state after driving said pump means.

3. The method described in claim 1 wherein the step of employing said thermal energy for converting said first liquid into supercritical state further includes continuously transferring heat from said second liquid to said first liquid.

4. The method described in claim 3 wherein the step of transferring heat from said second liquid to said first liquid further includes flowing said first liquid in counter flow thermal relation with respect to said second liquid.

5. The method described in claim 1 wherein said steps further include manipulating the specific heat of said first fluid to substantially match the specific heat of said second fluid.

6. The method of transferring thermal energy from an interior hot region within the earth for utilization adjacent the surface of said earth including the steps of:
   conveying a first liquid initially in a relatively cool state from a first station adjacent said surface of said earth to a second station within said earth,
   employing said thermal energy for converting said first liquid into supercritical state during transit from said first station to said second station,
   employing said first liquid in supercritical state for driving pump means at said second station,
   employing said pump means for pumping a second liquid from said interior hot region to said first station at a pressure retaining said second liquid always in liquid state,
   conveying said first fluid in supercritical state after driving said pump means in thermally insulated relation with respect to said second fluid to said first station, and
   abstracting thermal energy from said first fluid provided in supercritical state at said first station for performing useful work.

7. The method described in claim 6 wherein the step of employing said pump means for pumping said second liquid from said interior hot region to said first station further includes directly returning at said surface of said earth said second liquid into said earth.

8. The method described in claim 7 including the additional step of reconverting said first liquid after the step of abstracting thermal energy therefrom for forming said first liquid in relatively cool state.

9. Apparatus for recovery of thermal energy from a hot source of fluid within the interior region of the earth comprising:
   heat exchanging means extending substantially from a first station adjacent said surface of said earth to a second station within said earth for conveying a working fluid initially in a relatively cool state from said first station to said second station wherein said heat exchanging means includes means for increasing the heat transfer from the hot source of fluid to the working fluid from the second station to the first station,
   motive means at said second station operatively coupled to said heat exchanging means and responsive to the flow of the working fluid,
   pump means at said second station operatively coupled to and responsive to said motive means for pumping the hot source of fluid from said interior region through said heat exchanging means in heat transfer relation with said working fluid,
   insulative conduit means for conveying said working fluid from said motive means to said first station.

10. Apparatus according to claim 9 wherein said insulative conduit is disposed within said heat exchanging means.

11. Apparatus according to claim 9 wherein said heat exchanging means and said insulative conduit means are so cooperatively disposed that a differential pressure head is maintained between said working fluid in said heat exchanging means and said working fluid in said insulative conduit means for driving said working fluid.

12. Apparatus according to claim 9 wherein said heat exchanging means includes thermally conducting conduit means for conveying said working fluid and conduit means disposed about said thermally conducting conduit means for conveying said hot source of fluid.

13. Apparatus according to claim 12 wherein said thermally conducting conduit means includes means for increasing the heat transfer to the working fluid from said second station to said first station.

14. Apparatus for transferring thermal energy from a geothermal fluid from an interior hot region of the earth for utilization at the surface of said earth comprising:
thermally insulating pipe means forming first conduit means,
thermally conducting pipe means disposed about said thermally insulating pipe means for forming second conduit means,
third pipe means disposed in substantially coaxial relation about said thermally conducting pipe means for forming third conduit means,
pump means operatively coupled for pumping said geothermal liquid toward the surface of said earth within said third conduit means in heat exchanging relation with said thermally conducting pipe means, and
motive means for driving said pump means operatively coupled with said second conduit means and responsive to flow from the surface of said earth of a working liquid transferred to its supercritical state within said second conduit means.

15. Apparatus as described in claim 14 additionally including means for coupling said working liquid in supercritical state upon exhaust from said motive means into said first conduit means for return to the surface of said earth.

16. Apparatus as described in claim 15 further including thermal energy transfer means coupled to said first conduit means at the surface of said earth for abstracting a portion of said thermal energy from said working liquid when in supercritical state for performing useful work.

17. Apparatus as described in claim 16 further including means coupled to the output of said thermal energy transfer means for supplying said working liquid in relatively cool state to said second conduit.

18. Apparatus as described in claim 17 further including fourth conduit means coupled to said third conduit means at said first station for directly returning said geothermal liquid into said earth.

19. Apparatus as described in claim 17 wherein said pump means and said motive means comprise rotary pump means and rotary motive means having common shaft means equipped with liquid lubricated bearing means.

20. Apparatus as described in claim 19 further including:
first passage means coupled at said rotary motive means for supply of said working liquid to said liquid lubricated bearing means,
lubricant pump means on said common shaft means, and
second passage means coupled at said liquid lubricated bearing means for supply of said working fluid to said lubricant pump means whereby said working fluid is coupled to said first conduit means.

21. Apparatus for transferring thermal energy from an interior hot region of the earth for utilization adjacent the surface of said earth comprising:
heat exchanging means extending substantially from a first station adjacent said surface of said earth to a second station within said earth for conveying a first liquid initially in a relatively cool state from said first station to said second station while converting said first liquid into its supercritical state for driving motive means at said second station,
pump means at said second station responsive to said motive means for pumping a second liquid from said hot interior region at a pressure retaining said second liquid always in liquid state,
conduit means in heat exchanging relation with said heat exchanging means for conveying said second liquid from said pump means to said first station,
insulative conduit means for conveying said first liquid when in supercritical state from said motive means to said first station in thermally insulated relation with respect to said second liquid, and
thermal energy transfer means at said first station for abstracting a portion of said thermal energy from said first liquid in supercritical state for performing useful work.

22. Apparatus as described in claim 21 further including means coupled to the output of said thermal energy transfer means for supplying said first liquid in relatively cool state to said heat exchanging means at said first station.

23. Apparatus as described in claim 22 further including liquid transfer means at said first station coupled thereat to said conduit means for directly returning said second liquid into said earth.

24. Apparatus as described in claim 23 wherein:
said insulative conduit means is disposed within said heat exchanger means, and
said heat exchanger means is disposed within said conduit means in heat exchanging relation therewith.

25. Apparatus as described in claim 21 wherein said heat exchanging means and said conduit means are so disposed that the direction of flow of said first liquid in said heat exchanging means is always opposite to that of said second liquid whereby the termperature of said second liquid is continuously reduced in its transit of said conduit means from said second to said first station.

26. Apparatus as described in claim 21 wherein said insulative conduit means comprises a metal pipe having at least one of its surfaces coated with a thermally insulating material.

27. Apparatus as described in claim 21 wherein said heat exchanging means, said conduit means, said insulative conduit means, and said motive means are so cooperatively disposed that a differential pressure head is maintained between said first liquid in said heat exchanging means and said first liquid in said insulative conduit means for driving said motive means and for thereby transferring thermal energy from said second liquid to said thermal energy transfer means.

28. Apparatus as described in claim 21 wherein said first liquid is a halogen substituted hydrocarbon.

29. Apparatus as described in claim 21 wherein said first and second liquids are characterized by having substantially constant specific heat ratios.

30. Apparatus as described in claim 25 wherein said heat exchanging means and said conduit means are so disposed in operation that there is maintained a substantially constant temperature difference between said oppositely flowing first and second liquids along substantially all of said transit.

31. Apparatus as described in claim 25 wherein said heat exchanging means and said conduit means are so disposed in operation that there is maintained a greater temperature difference between said oppositely flowing first and second liquids along substantially all of said transit than at the opposed ends of said heat exchanging means.

32. Apparatus as described in claim 21 including means whereby the thermal transfer characteristic of said heat exchanging means is increased from a lowest value adjacent said second station to a maximum value adjacent said first station.

* * * * *